US007238257B2

(12) United States Patent
Risquez et al.

(10) Patent No.: US 7,238,257 B2
(45) Date of Patent: Jul. 3, 2007

(54) METHOD FOR MAKING A PRINTING BLANKET

(75) Inventors: José Risquez, Soultz (FR); Jerzy Kuczynski, Zillisheim (FR)

(73) Assignee: Macdermid Graphic Arts S.A., Cernay (FR)

( * ) Notice: Subject to any disclaimer, the term of this patent is extended or adjusted under 35 U.S.C. 154(b) by 0 days.

(21) Appl. No.: 10/304,750

(22) Filed: Nov. 27, 2002

(65) Prior Publication Data

US 2003/0129896 A1 Jul. 10, 2003

Related U.S. Application Data

(63) Continuation-in-part of application No. PCT/FR01/01678, filed on May 30, 2001.

(30) Foreign Application Priority Data

May 31, 2000 (FR) .................................. 00 07066

(51) Int. Cl.
*B41F 11/00* (2006.01)
*B32B 27/06* (2006.01)

(52) U.S. Cl. ............................ 156/304.6; 156/244.18; 156/244.19; 156/307.1; 156/308.2; 156/304.1; 156/304.5; 442/59; 428/909; 101/375; 101/401.1

(58) Field of Classification Search ............ 156/304.1, 156/304.2, 304.5, 304.6, 244.18, 244.19, 156/78, 244.24, 253, 307.1, 308.4, 308.2, 156/242, 157; 442/59; 428/402.2, 141, 428/909; 101/415.1, 382.1, 401.1, 383, 375; 264/45.3, 46.1; 263/45.4
See application file for complete search history.

(56) References Cited

U.S. PATENT DOCUMENTS

| | | | | |
|---|---|---|---|---|
| 5,252,157 | A * | 10/1993 | Inhofe, Jr. | 156/158 |
| 5,357,863 | A * | 10/1994 | McLean et al. | 101/389.1 |
| 5,364,683 | A * | 11/1994 | Flint et al. | 428/141 |
| 5,644,985 | A * | 7/1997 | Serain et al. | 101/415.1 |
| 5,653,169 | A * | 8/1997 | Puschnerat et al. | 101/415.1 |
| 5,817,402 | A * | 10/1998 | Miyake et al. | 428/159 |
| 6,367,684 | B1 * | 4/2002 | Hoffmann et al. | 228/125 |

FOREIGN PATENT DOCUMENTS

| | | |
|---|---|---|
| DE | 42 19 509 | 12/1993 |
| EP | 0 571 909 | 12/1993 |
| EP | 0 676 301 | 10/1995 |
| EP | 0 914 966 | 5/1999 |
| GB | 2 089 228 | 6/1982 |
| WO | 93 09941 | 5/1993 |
| WO | 97 00169 | 1/1997 |

OTHER PUBLICATIONS

International Search Report for PCT/FR01/01678.

* cited by examiner

*Primary Examiner*—Linda Gray
(74) *Attorney, Agent, or Firm*—Leydig, Voit & Mayer, Ltd.

(57) ABSTRACT

A method for making a printing blanket resulting from assembling a plurality of layers employs elastomer layers which do not contain thermal cross-linking agents and are of the thermoplastic type. Such a printing blanket is useful in the field of printing machines.

9 Claims, 3 Drawing Sheets

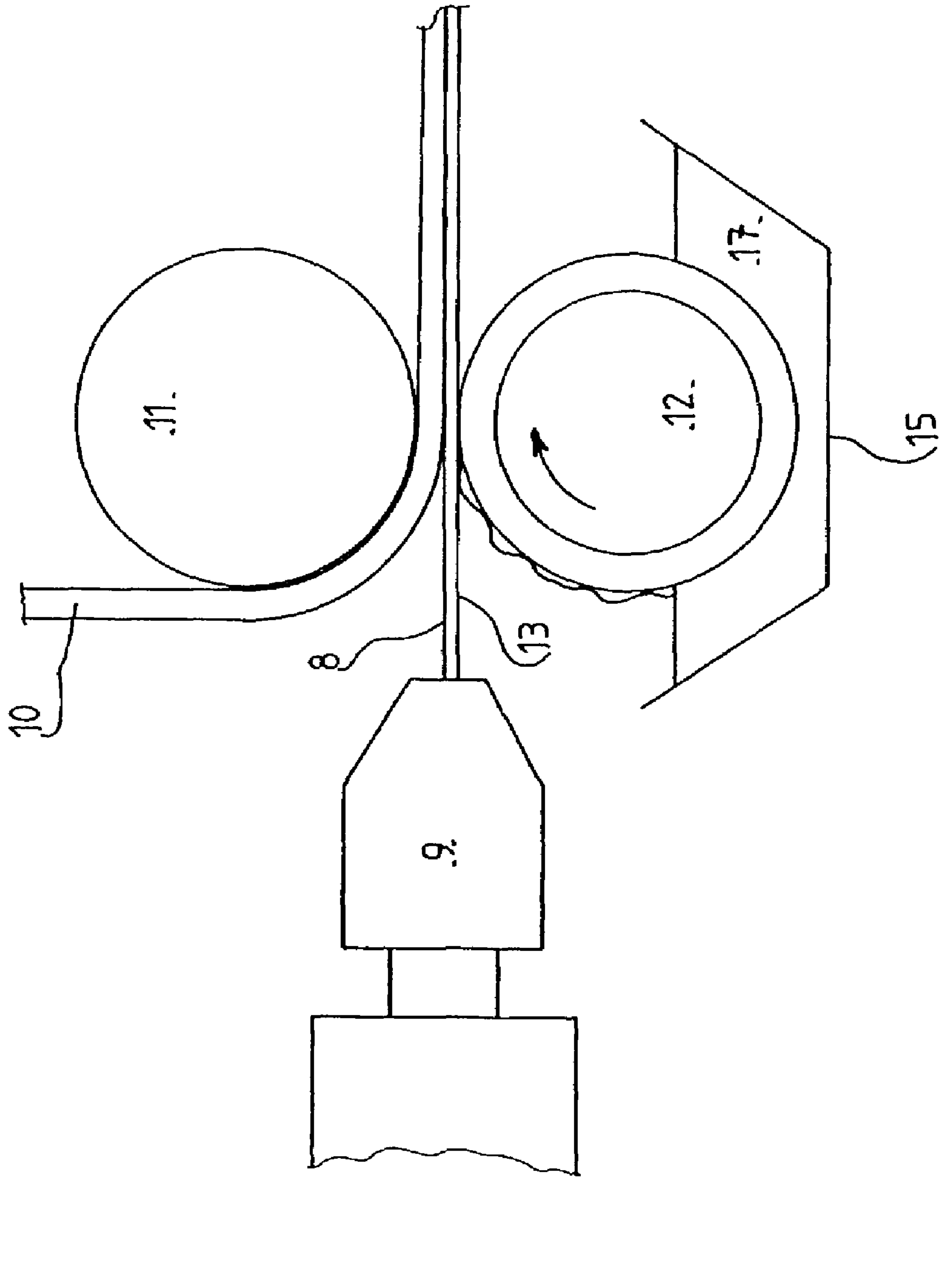
10
11
8
13
12
17
15
9

METHOD FOR MAKING A PRINTING BLANKET

RELATED APPLICATIONS

This is a Continuation-in-part of PCT/FR01/01678, filed May 30, 2001, which published in French as WO 01/92026.

This application is related to U.S. application Ser. No. 10/305,156, filed on even date herewith, which is a Continuation-in-part of PCT/FR01/01679 and is entitled "Method of Making a Multilayer Printing Blanket and Resulting Blanket".

This application is related to U.S. application Ser. No. 10/305,155, filed on even date herewith, which is a Continuation-in-part of PCT/FR01/01680 and is entitled "Method For Making a Printing Blanket Comprising a Back Layer Made Of A Polymer Material And Resulting Blanket".

BACKGROUND

1. Field of the Invention

The invention concerns a method for making a printing blanket resulting from assembling a plurality of layers and a blanket thus obtained.

2. Background of the Invention

Blankets of this type, which are known, are manufactured by coating successive layers of elastomers on fabric reinforcements. These layers are dried, assembled and vulcanized. The materials used and the manufacturing methods for these blankets involve the use of chemical substances dangerous to man and to the environment, such as solvents, vulcanizing agents, plasticizers and the products of decomposition at the time of vulcanizing as well as carbon black. In fact, these products contain, in particular, carcinogenic or presumed carcinogenic substances, such as plasticizers, carbon black and products of decomposition; substances that are hazardous to reproductive health and mutagenic substances, such as vulcanizing agents; allergenic, noxious and inflammable substances such as solvents; and toxic and corrosive substances. In addition, the known blankets manufactured according to known methods have a rate of residual solvents, no matter what precautions are taken for drying by the manufacturers. These residual solvents can cause porosity and untimely settling in storage and in service. It should be noted that settling is one of the serious defects in the printing blankets. The printing blankets also have the disadvantage of developing vapors and odors which can be unpleasant for the users when stored in confined spaces. Finally, these printing blankets according to the prior art may be difficult to dispose of at the end of their service life due, especially, to their amounts of chlorine and sulfur.

SUMMARY OF THE INVENTION

The method according to the invention is characterized in that the different layers are fastened to each other using means that do not involve solvents, in particular with a Corona-type processing, with ionization or localized heating.

According to one characteristic of the invention, elastomers that do not contain thermal cross-linking agents and are of a thermoplastic type are used for making the layers.

According to another characteristic of the invention, the elastomer layers are made by dry means without use of solvents, advantageously by extrusion.

According to another characteristic of the invention, to create a printing blanket in the form of a sleeve, a layer of a thermoplastic material of a predetermined length is rolled around a sleeve forming a support, after having beveled the ends of this layer, by superimposing the beveled ends and creating a tubular structure by attaching the ends by appropriate heating. The tubular structure thus obtained can be used as a support for making another tubular layer.

According to a characteristic of the invention, the lithographic layer of a printing blanket in the form of a sleeve is cross-linked by radiation, then straightened and buffed, if necessary.

According to another characteristic of the invention, the compressible tubular layer is made that has the possibility of expansion at the time of hot attachment of the ends, due to expandable microspheres, previously incorporated into the layer.

BRIEF DESCRIPTION OF THE DRAWINGS

The invention will be better understood, and other goals, characteristics, details and advantages thereof will appear more clearly in the explanatory description that will follow, given with reference to the attached schematic diagrams, given solely by way of example, in which:

FIG. 7 is a schematic view illustrating a method for making a blanket according to the invention.

DETAILED DESCRIPTION OF THE PREFERRED EMBODIMENTS

Figure 1:
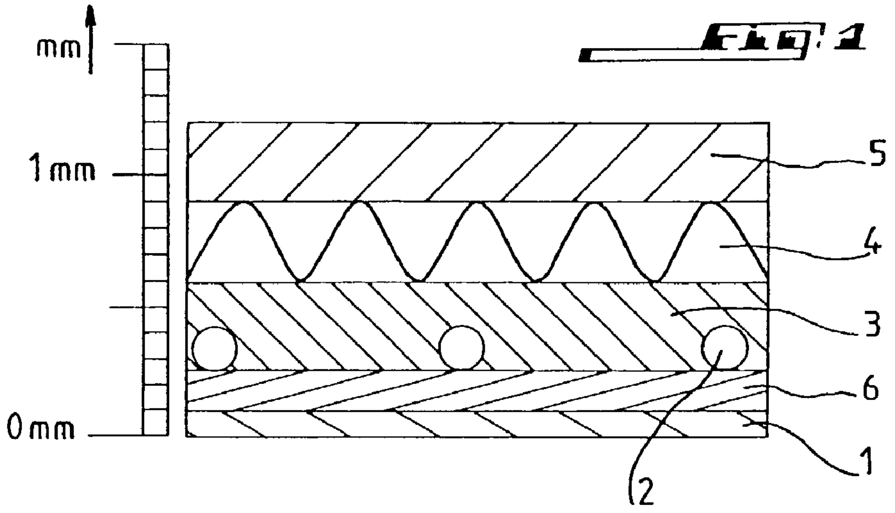
FIG. 1 is a cross sectional view of a first embodiment of a blanket according to the invention.

A multi-layer printing blanket according to the invention, which does not constitute a danger to man or to the environment, is advantageously made by extrusion of successive elastomer layers, assembled with reinforcements and other elastomer or polymer layers assembled in a calender downstream of the extruder. The fabrics used in the assembly of the layers are made to adhere to elastomer layers by Corona-type processing or ionization or localized heating to avoid the use of solvents.

It would also be possible to use pressure-sensitive adhesives without solvents.

The elastomers used in the scope of the invention are mixed in the sheath of an extruder supplied with various ingredients of the formulation, or premixed using known methods and fed into this sheath in the form of granules or the like.

The elastomers used within the scope of the invention have the special characteristics that they do not contain thermal cross-linking agents. They are thermoplastic in nature with a suitable rheology, and the different layers may be cross-linked by radiation after assembly of all or part of the blanket.

The elastomer layers are made by dry means without using solvents, and in particular by extrusion.

The materials used have the property of becoming fluid at high temperature and thus make possible the creation of thin films of good quality, especially by extrusion.

Examples of elastomers and reinforcements that can be used in blankets according to the invention are formulations of TPU type elastomers or polymers in association with other polymers, PP, PAN and PVC based dynamic vulcanization elastomers, elastomers of the styrene family, elastomer formulations of the olefin family, olefin copolymers and functionalized olefins, elastomers of the acrylonitrile family, EPDMs or CSMs, or even ACM or AEM and combinations of elastomers, modified or not, Aramid type fiber or thread reinforcements, polyethylene or polypropylene type fiber or thread reinforcements, polyester type fiber or thread reinforcements or mixtures of such fibers or such threads.

Because of their thermoplastic implementation and therefore their property of fusing simply by heating at high temperature to create perfect joints, materials with no solvents and thus not hazardous to man or the environment used within the scope of the invention, can be used to produce tubular blankets having one or more compressible layers, one or more reinforcement layers, a lithographic layer, combined, if necessary, with a support layer, with other functional layers or with filling layers.

Thus, for example, a tubular lithographic layer can be produced from a lithographic layer obtained by extrusion and cut to the appropriate length, and after beveling the ends, by rolling this layer onto a support sleeve, overlapping the beveled ends and heating them. This layer could be cross-linked by radiation, where appropriate, then precision ground and buffed. The support sleeve in this case could be the printing blanket layer on which the lithographic layer is placed. A compressible layer could be made of a similar material with the additional possibility of ensuring the expansion of this layer during the assembly of the ends as a result of the expandable microbeads previously incorporated in the materials forming the layer. The extruded film intended to become a compressible layer could advantageously include fibers that will be oriented in the plane during extrusion in order to confer anisotropic properties to the layer. An extruded film having oriented fibers can also function as a reinforcing or stabilization or paper flow control layer.

The tubular structure may also be obtained by direct extrusion of one or several successive concentric layers on the sleeve having an internal support and in the course of production. Direct extrusion could be of the tape or the annular type. As a variation, co-extrusion is also conceivable.

In producing the layer on the back, i.e. on the face opposite the face having the lithographic layer, of a polymer material that can be straightened, the thickness of the printing blanket can be made uniform by rectifying this layer on the back, while preserving or even improving the printing qualities of the blanket.

In particular, the rectification of the polymer layer on the back makes it possible to regulate the thickness of blankets with precision ground and buffed lithographic layer and blankets with smoother surface obtained by molding, and because of this, having excellent printing quality.

However, in general, the invention is applicable to all blankets the thickness of which should be made uniform, regardless of the means used to produce a lithographic surface that ensures good printing quality.

Compared to a blanket without rectification, the invention therefore makes it possible to obtain a gain in precision by a factor of 2, that is, an overall thickness tolerance of ±0.01 mm compared to about ±0.02 mm of the current status of the technology.

In addition to the uniformity of thickness of the blanket, the invention also makes it possible to obtain a reduction in the total thickness of the blanket. In fact, by separating the different functions to be accomplished by the blanket, and by allocating these functions to specific layers, an optimal structure of the blanket can be established by assembling layers of fabric, compressible layers and the lithographic layer. It has been established that the use of a beam or a thread or a woven grid makes it possible to replace several fabrics and thus to obtain a reduction in thickness. The use of a beam of Aramid type thread, for example, makes it possible to economize on the relative thickness by at least one fold of fabric. The gain is at least 0.5 mm. The beam used in the scope of the invention is itself of lesser thickness than the fabrics that it replaces.

Because the beam replaces reinforcement fabrics that contribute to the compressibility of the blanket, this compressibility is maintained in spite of the fact that fabric was removed, by making the polymer layer on the back compressible as a result.

Thus the invention allows a blanket to be made with a practically uniform thickness of 1.00 to 1.30 mm while preserving the breaking strength of known blankets that, for the most part, have a thickness of 1.7 to 2 mm.

The invention enables a blanket to be produced that has, from the interior toward the exterior, the following layers: a layer of slightly compressible polymer, an Aramid or equivalent beam in the warp direction, a main compressible layer, a stabilization fabric with, for example, monofilaments in the weft direction and flexible warp and a lithographic layer.

In a first variation, the stabilization fabric can be replaced by a layer of hard polymer possibly reinforced by fibers, and in a second variation, the compressible layer or layers can be made anisotropic by incorporating fibers oriented in the plane of the blanket.

FIGS. 1 to 6 show the structure of six advantageous forms of embodiment of a blanket according to the invention, having a reduced thickness. In these figures, reference number 1 designates a layer of slightly compressible polymer, number 2 a beam, number 3 a compressible layer, number 4 a stabilization fabric or a hard reinforced layer, number 5 a lithographic layer and number 6 a compact polymer layer.

The blanket shown in FIG. 1 has, from the interior to the exterior, a layer of slightly compressible polymer 1, a compressible layer 3 into which the beam 2 is integrated, a stabilization fabric or hard reinforced layer 4, and a lithographic layer 5. The blanket has a thickness of about 1.2 mm.

Figure 2:
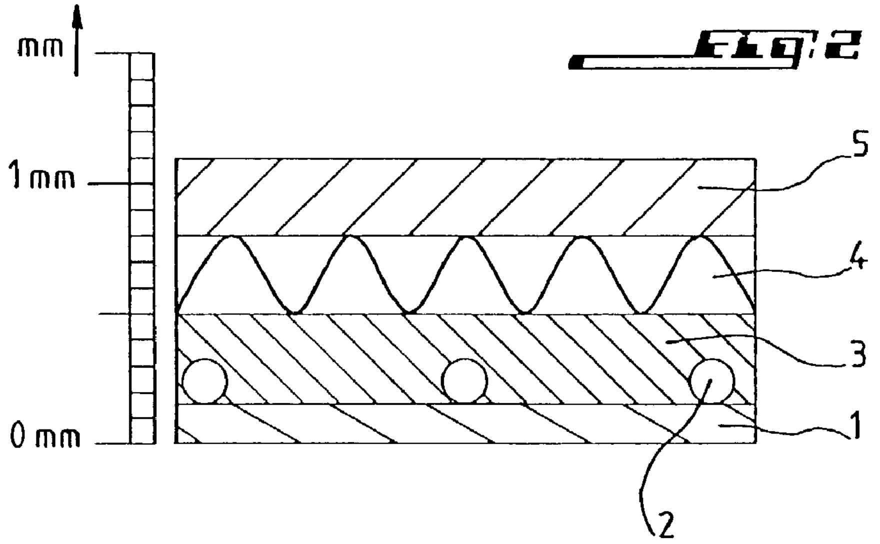
FIG. 2 is a cross sectional view of a second embodiment of a blanket according to the invention.

In the blanket according to FIG. 2, the compact polymer layer shown in FIG. 1 is left out, which allows the thickness of the blanket to be reduced to about 1.1 mm.

Figure 3:
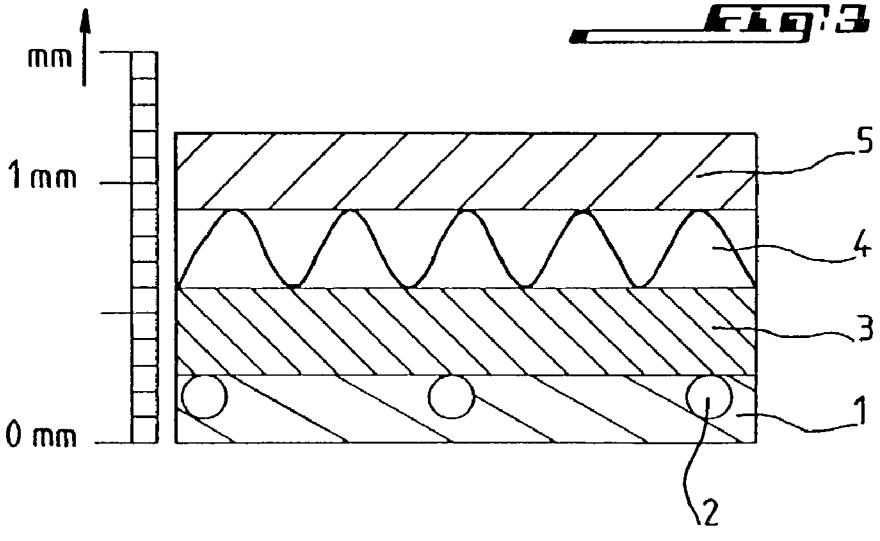
FIG. 3 is a cross sectional view of a third embodiment of a blanket according to the invention.

FIG. 3 shows a blanket in which the beam 2 is integrated into the polymer layer at the back of the blanket, the compact polymer layer 6 also being left out. The thickness of the blanket is about 1.2 mm.

Figure 4:
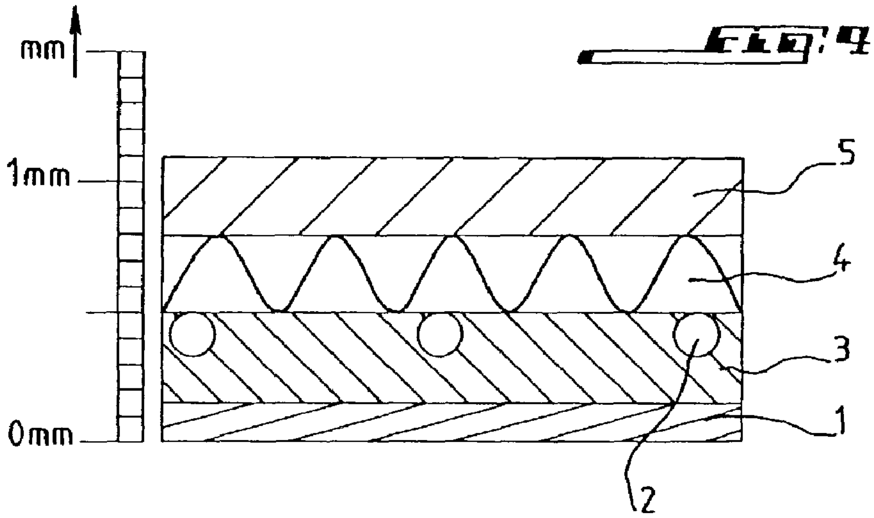
FIG. 4 is a cross sectional view of a fourth embodiment of a blanket according to the invention.

The blanket in FIG. 4 corresponds to the one in FIG. 3, the difference being that the beam 2 is integrated into the upper part of the compressible layer. The thickness of the blanket is 1.1 mm.

Figure 5:
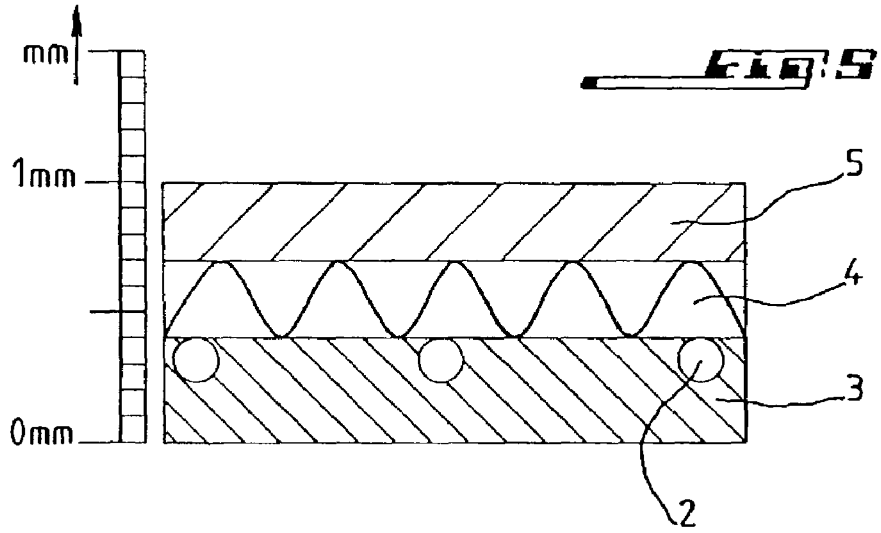
FIG. 5 is a cross sectional view of a fifth embodiment of a blanket according to the invention.

The blanket shown in FIG. 5 has an even smaller thickness of about 1 mm due to the fact that the layers 1 of compressible polymer and the layer 6 of compact polymer have been omitted, the assembly 2 being integrated into the upper part of the compressible layer 3.

Figure 6:
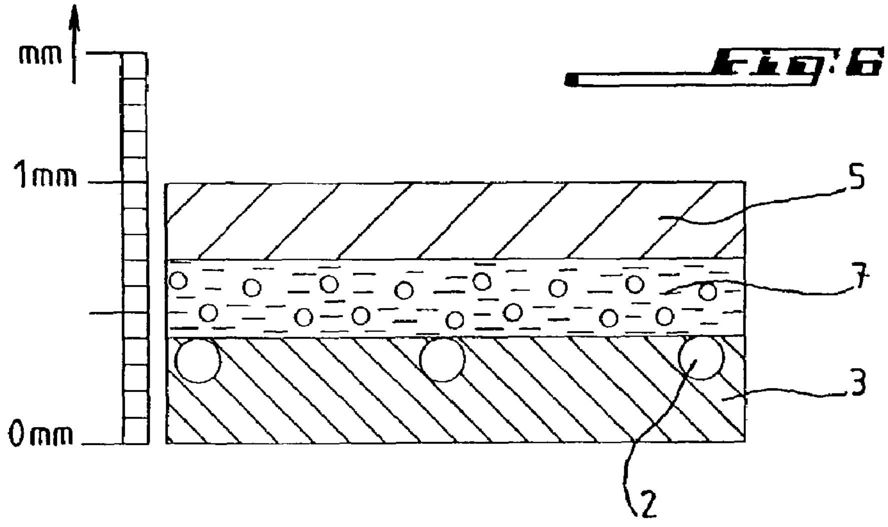
FIG. 6 is a cross sectional view of a sixth embodiment of a blanket according to the invention.

Finally, FIG. 6 shows a blanket having at the back a compressible layer 3 with the beam integrated into the upper part thereof, an anisotropic compressible layer 7 and a lithographic layer 5. The thickness of this blanket is also about 1 mm.

In the scope of the invention, it has proven advantageous to embed fine particles, e.g. glass microbeads or polymer or ceramic powders, in the surface of the lithographic layer of the blanket. Particular transfer surfaces are thus obtained having a microroughness and a specific microheterogeneity. By using glass microbeads, a good water spreading property is obtained on the surface. The embedding of the particles can also be made on the surface of the layer on the back if it is made of a polymer material. This embedding makes it possible to advantageously reduce the coefficient of friction of this surface. A low coefficient of friction is very useful to facilitate fastening on the cylinder of the printing machine.

The embedded particles are, preferably, of a spherical nature and have diameters between, preferably, 1 and 100 microns.

FIG. 7 illustrates a method and an installation advantageous for making this embedding. According to this figure, the polymer layer 8, the surface of which the particles must be embedded, is passed, downstream of the wire drawing extruder 9, with the body of the blanket represented by 10 between two cylinders of the calender 11 and 12. The cylinder of the calender which has come in contact with the surface to be treated 13, i.e. the lower cylinder 12, is immersed with its lower part in a vat 15 containing fine particles, e.g. in the form of a powder. The passage of the plunger cylinder through this vat causes the formation of a film of particles indicated with 17 on the surface of the cylinder that, by turning, transports and embeds in the surface 13 of the polymer layer 8. The roughness of the surface of the plunger cylinder makes up one of the quantity parameters for the particles transported. The vat can be activated by a vibration movement to guarantee regular deposit on the surface of the calender plunger cylinder.

A scraping device for the plunger cylinder may also be provided for metering the quantity of particles deposited and embedded on the surface of the blanket.

In a variation of embodiment, the embedding described here can be done on the surface of a previously extruded polymer film and, when applicable, rectified by simple heating of the surface thereof using known means, such as infrared banks, and passing the blanket with its layer of heated polymer on the surface between the rolls of the calender of FIG. 7.

As a variation, a film could also be deposited of liquid or pasty or doughy product which, driven by the dipping cylinder, is immobilized in contact with the hot polymer film on the surface of the blanket when it passes through the contact zone between the two rollers of the calender.

The invention achieves numerous advantages. As a result of the rectification of the polymer layer at the back of the blanket, the thickness of said blanket is more precise and uniform. This has a direct impact on the performance of the blankets. Indeed, a controlled thickness improves the printing quality and the durability of the blankets. A more regular thickness of the blanket also extends the service life of it by allowing a more reduced covering height that limits the mechanical stresses on the blanket and thus retards the possible appearance of overly light printing.

The excellent printing quality obtained by a smooth, and even very smooth, printing surface can be preserved. Such type of smooth surface allows details to be printed accurately and makes it possible to generate so-called "pointue" printing or "high fidelity" printing. It allows the use of a stochastic screen. The smooth surface can be characterized by a very low roughness, with an Ra (average roughness measured by a profilometer) of less than 0.4μ compared to values of 0.8 to 1.5μ for blankets using conventional technology. The deterioration of the thickness when a very smooth printing surface is desired, for example by buffing said surface, and the compromise made for known blankets being satisfied with a less heavy-duty buffing and therefore a less smooth surface, can be discontinued thanks to the rectification of the layer at the back, as proposed by the invention.

The reduction of the thickness of the blankets results in a reduction of vibration by allowing cylinders to be designed with narrow gaps for attaching the blanket and thus minimizing bouncing during rolling at high speed. Moreover, the invention ensures a reduction in cost in so far as a thin blanket requires less material to produce, materials being the largest portion of the cost of production.

The invention also makes it possible to reduce the quantity of waste. Indeed, thinner blankets mean a smaller quantity of waste to be eliminated. In addition, by embedding particles in the surface of the lithographic layer, or the layer at the back, it is possible to obtain a desired microheterogeneity of surface and/or reduce the friction of the blanket on the support. Finally, the invention makes it possible to produce "ecological" blankets, i.e. not causing any risk for man or for the environment.

What is claimed is:

1. A method of manufacturing a printing blanket including a plurality of different successive concentric layers of thermoplastic elastomers, the method comprising forming the layers from thermoplastic elastomers free of thermal cross-linking agents and solvents; and attaching the different successive concentric layers of said plurality of layers to one another, without the use of solvents throughout said plurality of layers by at least one of corona processing, ionization, and localized heating, wherein said attached plurality of layers are formed by:

rolling said plurality of attached layers of a thermoplastic material around a sleeve; and fusing together ends of thermoplastic material by heating and melting the ends.

2. The method according to claim 1, comprising beveling and then superimposing the ends prior to fusing together the ends.

3. The method according to claim 1, comprising expanding microspheres incorporated into the thermoplastic elastomers to form a compressible layer.

4. The method according to claim 3, including expanding the microspheres in heating the ends.

5. A method of manufacturing a printing blanket including a plurality of different successive concentric layers of thermoplastic elastomers, the method comprising:

forming the layers from thermoplastic elastomers free of thermal cross-linking agents and solvents; and attaching the different successive concentric layers of said plurality of layers to one another, without the use of solvents throughout said plurality of layers by at least one of corona processing, ionization, and localized heating, wherein said plurality of layers includes at least one lithographic layer, and said method comprises radiating said lithographic layer to promote cross-linking.

6. The method according to claim 5, comprising straightening and grinding said lithographic layer.

7. The method according to claim 1, including forming at least one of said plurality of layers of a thermoplastic elastomer by extrusion, without use of solvents.

8. The method according to claim 1, comprising forming each layer of the plurality of layers from thermoplastic elastomers free of thermal cross-linking agents and solvents.

9. A method of manufacturing a printing blanket including a plurality of different successive concentric layers of thermoplastic elastomers comprising at least an outer lithographic layer and a compressive layer, the method comprising:

forming the layers from thermoplastic elastomers free of thermal cross-linking agents and solvents; and attaching the different successive concentric layers of said plurality of layers to one another, without the use of solvents throughout said plurality of layers by at least one of corona processing, ionization, and localized heating.

* * * * *